April 3, 1962 H. R. FOGLIA 3,028,558

PULSE PRODUCING CIRCUIT

Filed Dec. 2, 1959

INVENTOR.
HENRY R. FOGLIA

BY Robert E. Sandt

AGENT

United States Patent Office 3,028,558
Patented Apr. 3, 1962

3,028,558

PULSE PRODUCING CIRCUIT

Henry R. Foglia, North White Plains, N.Y., assignor to International Business Machines Corporation, New York, N.Y., a corporation of New York Filed Dec. 2, 1959, Ser. No. 856,854
7 Claims. (Cl. 328—196)

This invention relates to pulse producing circuits, and more particularly to externally actuated electronic pulse producing circuits.

In many electronic circuit applications it is often desirable to produce output pulses of a constant amplitude from aperiodic input signals in accordance with predetermined variations in the input signal. Prior art devices which respond only to input signals above a predetermined minimum amplitude are well known, as are circuits which respond to signals only of less than a predetermined maximum amplitude. Combinations of the above circuit characteristics are also known, wherein signal input variations between minimum and maximum predetermined limits are the only signals to which the circuits are operatively responsive.

A more difficult problem, and one for which the instant invention provides a simple and effective solution is that of providing an output pulse of constant amplitude, the timing of which is determined by the timing of input signals having a predetermined relative amplitude with respect to the immediately preceding input signal level.

A particularly useful, though not limiting, application for such a circuit is in machines for the detection and identification of printed characters, especially of characters imprinted with magnetic ink. In such an application the apparatus must be capable of detecting relative changes in the character blackness, which changes because of the scanning pattern are indicative of the character configuration. As can be readily appreciated, variations in print density, as well as the contrast between the background and the characters themselves will produce wide ranges in absolute signal strength as well as relative changes in signal strength. Since the logical circuitry associated with such sensing devices is only concerned with the relative timing of signal discontinuities manifestive of the character configuration, it is desirable to have a circuit capable of producing discrete pulses of constant amplitude where the timing thereof is controlled by the relative input signal discontinuities.

It is therefore an object of this invention to provide a pulse producing circuit for producing pulses having a constant amplitude, and whose timing is controlled by the occurrence of input signals having a predetermined excursion from the immediately preceding signal level.

A further object is to provide a circuit in accordance with the preceding object wherein the output constant amplitude impulses are produced by a bistable trigger circuit, the control of which is vested in a circuit which stores the level of the immediately preceding input signal so that variations therefrom may be manifested by a change in status of the trigger circuit.

Yet another object of the invention is to provide a circuit wherein a variable bias potential is established for the changing of the status of a bistable trigger element in accordance with variations of an input control signal.

The foregoing and other objects, features and advantages of the invention will be apparent from the following more particular description of a preferred embodiment of the invention, as illustrated in the accompanying drawings.

Figure 1:
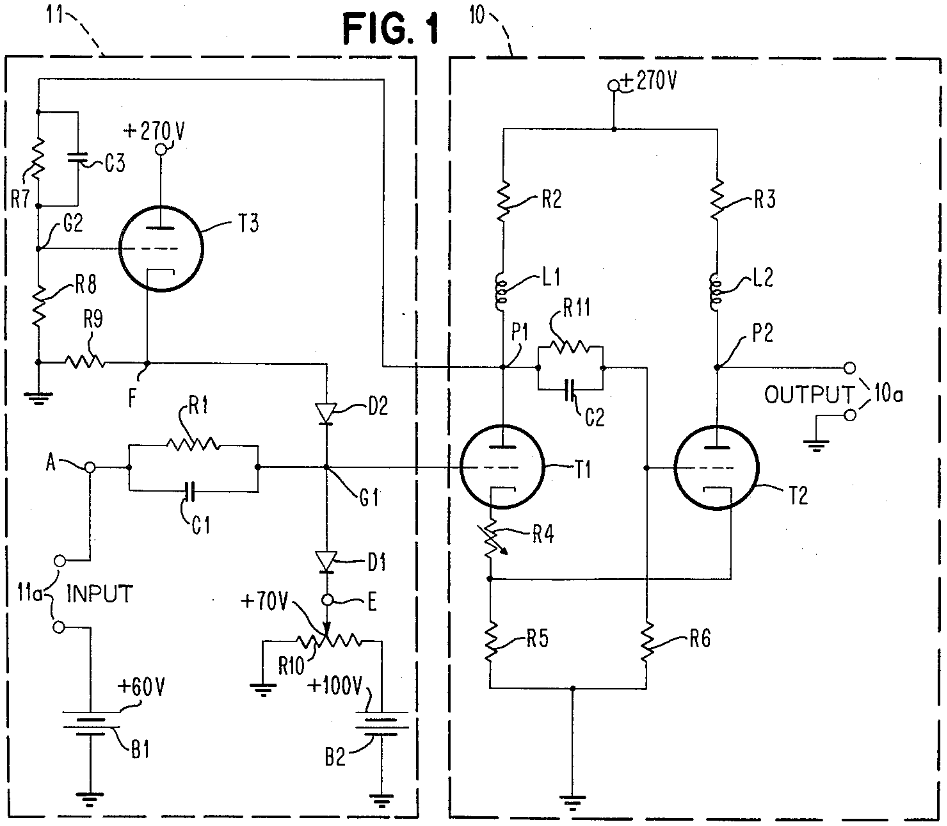
FIGURE 1 is a circuit diagram of an exemplary embodiment of the invention.
Figure 2:
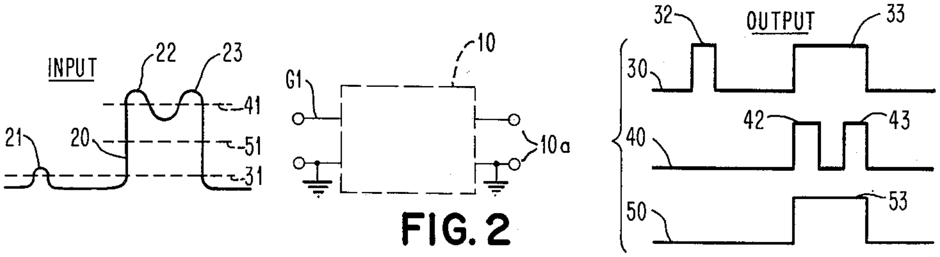
FIGURE 2 is a response curve of a conventional trigger circuit.

In FIGURE 1 a conventional Schmitt trigger is shown in the dotted box 10, which circuit configuration has the capability of producing a constant amplitude output pulse in response to an input signal having a predetermined minimum amplitude above a fixed reference potential. Although such circuit can be made highly sensitive to input signals of small magnitude, it is incapable of distinguishing input impulses which are not separated one from another by a return to the pedestal or off triggering voltage for which the trigger is adjusted. Thus, if as in FIGURE 2 an input waveform 20 is applied to the trigger, the three ouput pulse patterns will be one of 30, 40, and 50 shown to the right are possible, depending on the bias of the trigger. In the upper output pulse pattern 30, the trigger is adjusted such that any voltage above the level 31 will turn the trigger on, and any voltage below that level will restore the trigger to its off status. Visual examinations will quickly reveal that only two output pulses 32 and 33 are produced for three very definite discontinuities 21, 22, and 23 in the input waveform, the joined discontinuities 22 and 23 having not been manifested because the input signal had not returned to below the necessary off triggering bias level. If now the triggering bias level is set at 41 then the 40 output pulse pattern will be produced, which pattern now manifests the second and third discontinuities 22 and 23 but ignores the first discontinuity 21, as such was of insufficient magnitude to trigger. The final bias adjustment at the 51 level produces the third and last output pulse pattern 50, which is least revealing of the input waveform, inasmuch as the bias chosen is too high to be responsive to the first discontinuity 21 of the input waveform and too low to be responsive to either the second 22 or third 23 discontinuities. For any other input waveform, wherein there is no return to the necessary bias pedestal between discontinuities in the input waveform, the trigger will not accurately manifest such waveform by the timing of output pulses.

Figure 3:
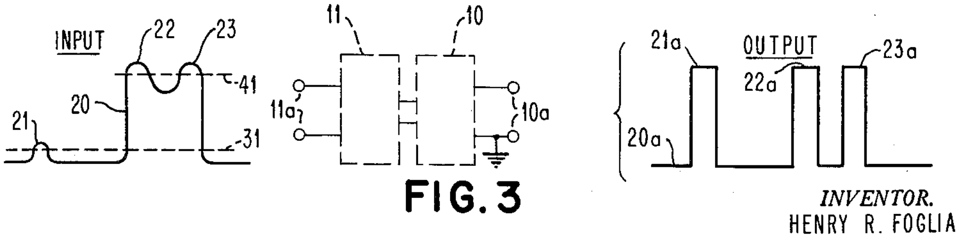
FIGURE 3 is a response curve of the circuit apparatus of FIGURE 1.

By the addition of the circuitry within the dotted rectangle 11 in FIGURE 1, the combined circuit can be made to produce an output pulse pattern such as that shown in FIGURE 3, wherein each discontinuity in the input waveform is manifested by a correspondingly timed output pulse of constant amplitude. The additional circuit thus serves an automatic level setting function wherein the triggering bias pedestal is constantly adjusted in accordance with the previous operational history of the device. Thus in FIGURE 3 the first input signal discontinuity 21 is detected because the circuit is operative responsive to any input signal greater than the 21 level bias so that the trigger is successively turned on and off by the positive and negative going portions of the input signal, and the circuit remains conditioned to be responsive to any signal varying about the 31 level until the occurrence of the next following discontinuity. When the large positive-going input signal 22 occurs, the signal is sufficiently in excess of the previous level 31 so that the trigger will be turned on in response thereto. Because of the circuit included within the dotted rectangle 11, the large positive-going excursion of the input waveform will be stored, or remembered, so that a decline from the peak value thereof will result in a turning off of the trigger. Effectively therefore the circuit establishes a bias at the 41 level so that the valley potential separating the peaks 22 and 23 will be sufficient to turn the trigger off, and the return to peak value at 23 will be sufficient to turn the trigger 10 on again. The final large negative-going excursion of the input wave will turn the trigger off when the potential of the input signal becomes less than the 41 level, and the circuit will operate to re-establish the necessary operating bias at the 31 level in anticipation of any subsequently occurring positive-going input signals. Thus the square pulse output pattern accurately manifests the time spacing of the input waveform discontinuities and still provides a constant amplitude output for a varying amplitude input waveform. Examination reveals that the input waveform discontinuities 21, 22, and 23 are faithfully reproduced in their time of occurrence by the respective constant amplitude pulses 21*a*, 22*a*, and 23*a*. In the discussion hereinafter to be had it will be shown that the versatility of the circuits permits a latitude of response which not only includes that just described but others also.

In FIGURE 1, the circuit enclosed within the dotted rectangle 10 constitutes a conventional Schmitt trigger circuit, the circuit values for the components thereof being included in the overall table of values of an exemplary device hereinafter to be set forth. For the purposes of discussion the trigger will be referred to as in the "off" state when T1 is non-conducting and T2 conducting and vice versa. As is conventional in such a trigger circuit, the plate potential of one of the tubes of the trigger pair is low when the tube is conducting and high when the tube is non-conducting. Thus in FIGURE 1 with the trigger in the "off" state the potential of the point P2 is low, as in the potential difference across the output terminals 10*a*. The circuits 10 and 11 are so designed and interconnected that a positive-going input signal impulse applied across the input terminals 11*a* will turn the trigger 10 on so as to raise the potential of point P2 to produce a positive output signal and vice versa.

Another useful characteristic of the trigger circuit is that the triggering voltage necessary to turn the trigger on or off can be adjusted so as to render the trigger extremely snesitive to small triggering voltages. In the instant circuit application the trigger 10 is adjusted so that a potenial at G1 of +60 volts will insure that the trigger is off and a potential of +65 volts will turn the trigger on, although these are arbitrarily chosen values.

With the foregoing in mind, an examination will now be had of the effect of the circuit 11 upon the response of the trigger 10. All input signals appears across the input terminals 11*a*, and because of the +60 volt bias potential supplied by battery B1, the potential of the point A will be the potential of the input signal added to that of battery B1. Assuming no signal is present at input terminals 11*a*, the +60 volt potential of battery B1 will be impressed upon the point G1, there being no current flow through either the diode D1 or D2 inasmuch as the potential of point E is greater than the potential of G1, the diode D1 being so oriented as to block flow from point E to G1, and the potential of point F is equal to or less than point A, the diode D2 being connected to prevent flow from G1 to point F. Thus point G1 being at +60 volts will insure that the trigger is off. With such status of the trigger, the point P1 will be of higher potential than it is when T1 is conducting. With the circuit parameters chosen, the potential of G2 will be such that the conductivity of tube T3 in its cathode follower connection will produce a potential at point F of +60 volts or slightly less.

If now a positive-going input signal such as 21 (FIGURE 3) is applied across the input terminals 11*a* and equal to, for example +5 volts, the potential of point A will rise to +65 volts, as will the potential of point G1.

Except for the possibility of a slight grid current in tube T1 there is no current path out of the point G1, so that any small voltage rise of point A will be manifested at point G1, there being no tendency to charge the capacitor C1, as point A is still at a lower potential than point E, and at a higher potential than point F. The rise in potential of point G1 will turn the trigger 10 on to produce the output pulse 21*a* (FIGURE 3). Upon cessation of the input signal 21, the potential of points A and G1 will return to the +60 volts cutoff bias and the trigger 10 will be turned off.

If now the input signal 22 appears across the terminals, and it is assumed for purposes of explanation that such signal has a maximum amplitude of +20 volts and a potential in the valley following of +10 volts, then the potential of point A will rise to +80 volts followed by a decline to +70 volts, all with respect to ground. With C1 discharged, point F at +60 volts, and point E at +70 volts, the positive-going potential excursion of point A will initially be directly manifested by a corresponding potential rise of point G1, there being no tendency for conduction through either of the diodes D1 or D2 because of the respective potentials of points E and F. When the potential of point A and G1 rises to +65 volts, the trigger 10 will be turned on to initiate the output pulse 22*a* (FIGURE 3). As the input signal continues to rise, and with it the potential of point A, there will be achieved a condition wherein at some time the potential of point A will reach +70 volts and continue until it reaches +80 volts. Neglecting for the moment circuit time constants and characteristics of the diodes, the higher potential of point A relative to point E will induce a flow through the diode D1 whereby the capacitor C1 charges, and when point A attains its ultimate potential of +80 volts the charge therein will be 10 volts with a positive polarity toward the point A. Thus at the peak of the input signal 22, point A will have a potential of +80 volts, point G1 +70 volts, point E +70 volts, the capacitor C1 will have a 10 volt charge thereon, and the trigger 10 will be on. With trigger 10 on, the potential of P1 (with T1 conducting) will be down, as will the potential of G2 and point F, by virtue of the cathode follower connection of tube T3. Capacitor C1 will therefore be even more thoroughly isolated from point F by diode D2, as point F may now have assumed a potential perhaps in the vicinity of +40 volts.

As soon as the input signal 22 begins to recede from its peak value, the charging of capacitor C1 will cease, and will begin to discharge slowly through the large resistance R1. Remembering that C1 was charged with 10 volts, and neglecting for the moment the discharging effect through resistance R1, when the input signal declines so as to reduce the potential of point A to 70 volts (10 volt input signal) the 10 volts stored in the capacitor C1 will be subtracted therefrom to produce a potential at point G1 of +60 volts which potential is sufficient to turn the trigger 10 off.

When the trigger 10 is now off, point F returns to the cutoff potential of +60 volts, point A is at +70 volts, capacitor C1 has 10 volts stored therein, and point E is held at +70 volts. With the above voltage distributions, and particularly with the potential of F at +60 volts and point G1 also at +60 volts there is no tendency for diode D2 to conduct to provide a quick discharge path, for capacitor C1 which will continue its slow discharge through the resistor R1.

If as assumed in the example chosen, the input signal 23 (FIGURE 3) now appears across the input terminals 11*a*, the potential of point A will again rise to +80. At some phase of the transition, the potential of point G1 will rise to the necessary +65 volt triggering potential, its potential being equal to the potential of point A minus the charge on capacitor C1, which, if it is assumed that the discharge effect of resistor R1 is relatively negligible, is 10 volts by virtue of the previous history of input signal excursions. At the triggering potential, the trigger 10 will be turned on, and the continued rise of point A will replace whatever charge was lost in capacitor C1 by leakage through resistor R1, and the tube T1 will remain conducting (trigger "on") until the input signal 23 (FIGURE 3) begins to decline and the potential of point G1 returns to +60 volts. Now, however, when the trigger 10 is turned off and point F returns to +60 volts potential, the input signal completely collapses so as to return the potential of point A to +60 volts. With such voltage distribution and with 10 volts charge on capacitor C1, the potential of point G1 is at 50 volts to produce a potential difference across the diode D2 of 10 volts to induce a flow therethrough to provide a rapid discharge path for the capacitor C1 which will be completely discharged. Thus the circuit condition is restored to its initial status and any positive-going signal of sufficient amplitude will again turn the trigger on.

A further condition commending passing comment is that wherein a newly occurring positive-going impulse does not occur for a prolonged period following a large input signal with a return thereof to a level above zero. Such a condition would occur if in FIGURE 3 the input signal 23 did not appear for a prolonged period and the input signal level remained at the valley potential between signals 22 and 23. In such instance point A for the exemplary conditions chosen would be held to +70 volts and the capacitor C1 having an initial charge of 10 volts would gradually lose its charge through resistor R1 resulting in a gradual increase in potential of G1 to turn the trigger back on when G1 reached +65 volts on its way to the ultimate value of +70 volts. Although such may appear to be a disadvantage, it must be remembered that there is being dealt with here a constantly varying input signal so that by appropriate design of the time constant of the RC circuit consisting of R1 and C1 with respect to the probability of occurrence of a non-varying input signal, the problem is easily met. Nor is it a desirable solution to eliminate R1 from the circuit so as to obviate the condition, for then there will be eliminated a constant discharge path for the capacitor C1, which because of the reduced conductivity of diodes for small potential differences thereacross, could result in a cumulative charging of the capacitor which would not be a true manifestation of the past history of excursions of the input signal. Therefore, the resistance of R1 relative to the capacitance of C1 is chosen high enough so that the expected repetition rate of input signals will be accurately manifested. Another important function of R1 is to provide a D.C. coupling between point A and point G1 so that input pulses of long duration will be accurately manifested by the continued conductivity of tube T1. Absent such resistor, a long-lasting positive input pulse would turn the trigger "on" but with only a capacitive coupling between A and G1 there would be no sustaining potential for the point G1 so as to maintain the trigger "on" for the duration of the input pulse. Thus with resistance R1 in the circuit point G1 is maintained at its elevated potential for the duration of the input pulse.

A further variation in the operation of the circuit is achieved when an abnormally large input signal is received followed by a return to a greater than zero potential signal. Assume for the purposes of explanation that the input signal rises from 0 volts to +30 volts followed by a return to +10 volts. Here the point A will undergo an excursion from +60 volts, to +90 volts, with a return to +70 volts. For the first ten volts of rise of point A, the point G1 will follow as there is no tendency of D2 to conduct, and the trigger 10 will be turned on when a potential of +65 volts is obtained at G1. When G1 exceeds +70 volts, diode D1 will begin to conduct and capacitor C1 will charge therethrough until the peak of +90 volts is attained when C1 will have been charged with 20 volts, G1 having been effectively clamped at approximately +70 volts by the action of diode D1. Upon a decrease of 20 volts from the peak signal voltage, point A will attain a potential of 70 volts, and with 20 volts charge on capacitor C1, of negative polarity toward G1, the potential of G1 will be reaching for +50 volts. During the decay of the input signal point G1 will, when it reaches +60 volts, turn the trigger off. When the trigger is off, point F rises to +60 volts and with point G1 at +50 volts or at least seeking it, conduction through diode D2 will be induced until the charge on C1 is reduced to 10 volts wherein point G1 is at +60 volts to block conduction of D2. C1 is thus left with 10 volts charge thereon so that any subsequent positive-going excursion of point A will be manifested by a corresponding rise in potential of point G1 related to the +60 volts so as to turn trigger 10 on.

From the foregoing explanation of the operation of the circuits 10 and 11, it will be appreciated that the capacitor C1 together with the adjustable charge controlling path through D1 and the discharge path D2 controlled by the status of the trigger, the immediately preceding operating level of the input signal is remembered or stored so that the relativity thereto of the next succeeding input signal is effective to produce a corresponding output pulse. As is apparent in the drawings, the potential difference necessary to establish the discrete on and off status of trigger 10 is made adjustable through the variable resistor R4 which can be so adjusted that in fact the trigger becomes astable and oscillates. The +60 and +65 volt levels employed for purposes of explanation being purely arbitrary. A further arbitrary choice of potentials was that of +70 volts for the point E. With the inherent adjustability of the potentiometer R10 it is obvious that point E could be potentialized at any point from ground potential to +100 volts although potentials below +65 volts would not as a matter of course be chosen. Inasmuch as the potential adjustment of point E serves as a clamp on the potential of point G1, if point E is biased too low, point G1 could only undergo an instantaneous positive excursion in accordance with the time constant of C1 and R10 which time costant is relatively low because of the relatively low resistance (1,000 ohms) of R10 and large capacitance (2,000 micro-micro farads) of C1. With such limitation or clamp upon G1, the circuit would not provide a true output pulse pattern manifestive of the input waveform. Discretionary adjustment of the potential of point E would therefore more likely occur in the region above +65 volts in accordance with the response desired of the circuit.

Although a Schmitt trigger has been shown it does not follow that this is the only type trigger which will operate in this circuit. As will be apparent from an examination of FIGURE 1, the feedback from the anode circuit of tube T1 to the grid of the cathode-follower connected tube T3 requires only that the point P1 rise or fall in accordance with the conductivity status of the tube T1. Such certainly is a characteristic of any of many well known trigger circuits. So too is the output connection 10*a* placed in the anode circuit of tube T2. The only particular recommendation for a Schmitt type trigger is its easily adjustable sensitivity to input signals, for again any of the well known trigger circuits operate responsive to positive and negative-going signals varying about a pedestal voltage to turn the trigger on and off.

Although the values of the various circuit components can be chosen from a large number of possible combinations, certain interrelationships must necessarily be preserved in order to have an efficiently operating device. Rather than set forth all of the necessary relationships that should be preserved as good design criteria, there are shown below the values and component types for all the elements of an exemplary operative circuit working in accordance with the description hereinabove had.

| | |
|---|---|
| R1 | 100K ohms. |
| R2 and R3 | 15K ohms. |
| R4 | 2K ohms total, 1.3K ohms set. |
| R5 | 10K ohms. |
| R6 | 94K ohms. |
| R7 and R11 | 220K ohms. |
| R8 | 60K ohms. |
| R9 | 6K ohms. |
| R10 | 1K ohms. |
| L1 and L2 | 200 micro-henries. |
| C1 | 2K mmf. |
| C2 | 10 mmf. |
| T1 and T2 | Type 5965 twin triode. |
| T3 | ½ of Type 5965 twin triode. |
| D1 and D2 | Type 1N119 or 1N120 diode. |

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a pulse producing circuit for producing constant amplitude square wave output pulses timed by the occurrence of the input signal waveforms having a predetermined excursion from the immediately preceding input signal level, the combination of a bistable trigger circuit having input and output terminals, and adapted to operate responsive to a potential difference of a first predetermined magnitude across said input terminals to assume a first of said bistable states, and to a potential difference of a second predetermined magnitude greater than said first magnitude to assume a second of said bistable states to produce a positive-going output signal in response to a change from said first to said second state, and a negative-going output signal in response to a change from said second to said first state, and having a further terminal therein, the potential excursions of which are opposite to those of said output terminals; signal input terminals having a variable potential input waveform thereacross whose relative timing is to be manifested by the occurrence of said output pulses; a capacitor coupling said signal input terminals and said trigger input terminal; means connected to said trigger input terminal for preventing said terminal from attaining a potential greater than a predetermined value, which value is greater than said second predetermined magnitude, the said means being inoperative to prevent said trigger input terminal from attaining a potential less than said predetermined value; and means connected to said further terminal of said trigger circuit and to said trigger input terminal and operative responsive to said first state of said trigger circuit to prevent said terminal from attaining a potential less than said first predetermined magnitude, the said last named means being inoperative to prevent the said trigger input terminal from attaining a higher potential.

2. In combination with a trigger circuit having two stable states of conduction and operable responsive to predetermined potential levels applied to an input terminal thereof to assume respective ones of said stable states of conduction, signal input terminals having a variable potential input signal impressed thereacross, a capacitor connecting said signal input terminals with said trigger input terminal, means connected to said input terminal to limit the potential thereof to a predetermined maximum, and means connected to said trigger input terminal and operative responsive to one only of said stable states of conduction of said trigger circuit for limiting the potential of said trigger input terminal to a predetermined minimum value.

3. The combination of claim 2 wherein said means for limiting the maximum potential value of said trigger input terminal comprises a diode connected between said terminal and a source of reference potential with the diode being connected for forward conduction from said terminal to said reference source.

4. The combination of claim 2 wherein said means for limiting the potential of said trigger input terminal to a predetermined minimum value comprises, a diode connected between said terminal and the cathode of a cathode follower circuit, the said diode being arranged for forward conduction from said cathode to said terminal, and the control electrode of said cathode follower circuit being connected to said trigger circuit to manifest its status of conductivity.

5. A pulse producing circuit comprising a trigger circuit having first and second states of stability, and operative responsive to a potential of a first predetermined magnitude to assume said first state, and responsive to a higher potential of a second predetermined magnitude to assume said second state, and having input, output, and a further terminal, the said output terminal being so connected in said trigger circuit that the potential thereof rises when said trigger circuit changes from said first state to said second state, and said further terminal being connected so that its potential falls for a similar change in the trigger status; signal input terminals having a variable input signal potential impressed thereacross; a capacitor connecting said signal input terminals and said trigger input terminal; a first diode connected between said trigger input terminal and a source of reference potential greater than said second predetermined magnitude so as to permit conduction therethrough if the said input terminal achieves a potential greater than said reference potential; a cathode follower circuit having a control terminal and a controlled terminal, the said control terminal thereof being connected to said further terminal in said trigger circuit; and a second diode connected between said controlled terminal and said trigger input terminal in such fashion that conduction therethrough will be effected if the potential of said trigger input terminal is less than the potential of said controlled terminal, the said cathode follower circuit being so designed that the potential of said controlled terminal is substantially equal to said first predetermined magnitude when said trigger circuit is in said first state of stability.

6. A pulse producing circuit for producing constant amplitude square wave output pulses having a timed relationship controlled by an aperiodic input signal of varying amplitude comprising, a pair of input signal input terminals across which is impressed said aperiodic signal, one of said input terminals being connected to a source of fixed reference potential; a trigger circuit having a pair of electron valve devices including anode, cathode and control electrodes cross-connected in such fashion that a control potential of a first magnitude applied to the control electrod of the first valve will render said first valve conducting and said second valve non-conducting, and a control potential of a second lower magnitude will render said first valve non-conducting and said second valve conducting; an output terminal connected to the anode of said second valve; a shunt connected capacitor and resistor serially connecting the other one of said signal input terminals with the control electrode of said trigger valve; a cathode follower circuit including an electronic valve device having a cathode, anode, and control electrode, the control electrode being connected to the anode of said first trigger valve so that the cathode potential of said cathode follower circuit assumes a potential substantially equal to said second lower magnitude when said first trigger valve is non-conducting; a diode connecting said first trigger valve control electrode with a source of reference potential greater than the said first magnitude the diode being connected for forward conduction from said electrode to said source; and a diode connecting the cathode of said cathode follower circuit with the control electrode of said first trigger valve to permit forward conduction from said cathode to said control electrode.

7. In combination with a trigger of the Schmitt type, signal input terminals having a variable potential input signal impressed thereacross, a capacitor connecting said signal input terminals with an input terminal of said Schmitt trigger, means connected to the trigger input terminal to limit the potential thereof to a predetermined maximum, and further means connected to the trigger input terminal and operative responsive to the conductivity status of said trigger circuit to limit the potential of the input terminal to a predetermined minimum value.

References Cited in the file of this patent

UNITED STATES PATENTS

| | | |
|---|---|---|
| 2,494,865 | Fleming-Williams et al. | Jan. 17, 1950 |
| 2,683,806 | Moody | July 13, 1954 |
| 2,696,557 | Gray | Dec. 7, 1954 |
| 2,797,319 | Moody | June 25, 1957 |
| 2,819,396 | Russell | Jan. 7, 1958 |
| 2,857,516 | Permutter | Oct. 21, 1958 |